Jan. 20, 1970     K. M. ILLIG     3,490,455
SURGICAL DEVICE
Filed May 17, 1965
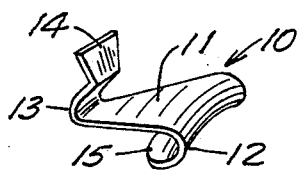
FIG. 1
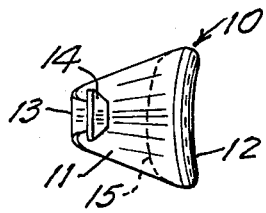
FIG. 2
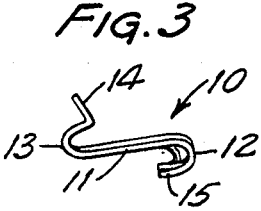
FIG. 3
FIG. 4
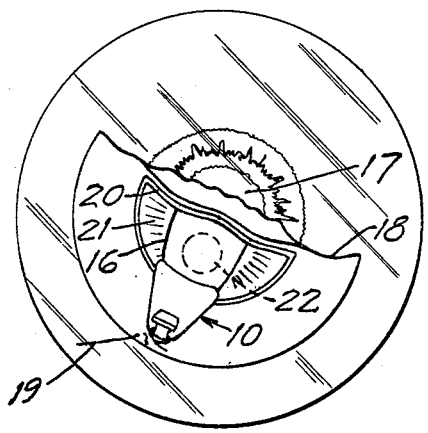
FIG. 5
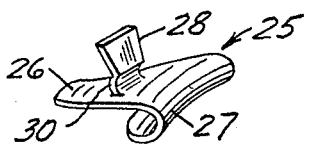
FIG. 6
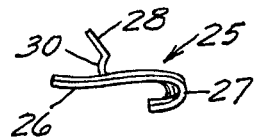
FIG. 7
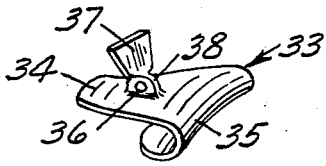
FIG. 8
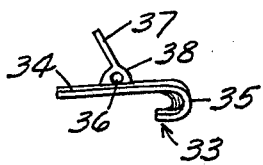
FIG. 9
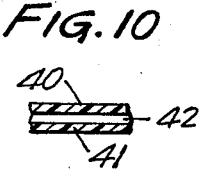
FIG. 10
INVENTOR.
KARL M. ILLIG
BY
John C Barnes
ATTORNEY

# 3,490,455
SURGICAL DEVICE
Karl M. Illig, Pierre, S. Dak.
(953 Stevens Drive, Richland, Wash. 99352)
Filed May 17, 1965, Ser. No. 456,236
Int. Cl. A61b *17/04, 9/00*
U.S. Cl. 128—303     3 Claims

ABSTRACT OF THE DISCLOSURE

An iris retractor device which is small enough to be attached to the eyeball. The device includes a curved body member having a handle and an integral broad bight hook which embraces a broad edge of the iris. A thread is attached to the retractor and is sutured to the sclera portion of the eyeball. Forceps may be used to grasp the handle to position the retractor while the thread is pulled to anchor the retractor in place.

---

The present invention relates to a device for use during surgery and in one aspect relates to a device for retracting the iris of the eye during any operation thereon requiring removal of the lens.

Cataract surgery requires the removal of the crystalline lens which has become opaque. The crystalline lens is generally replaced by an optical substitute such as a lens of high power. This optical substitute is placed in front of the eye or within its anterior chamber.

This operation has undergone numerous changes since its first performance due to the development of various ingenious instruments and ingenious techniques. During the operation the crystalline lens with its friable capsule, which is suspended by a system of fine fibers behind the iris, has to be taken out and this is done by breaking these fibers to free the lens. Three principle means have been used to break the suspension fibers, these are traction at the lens surface, pressure through the hull of the eyeball from its outside, and dissolution of the lens fibers by a digestive enzyme.

Traction on the crystalline lens has been exerted by several kinds of forceps or by a small suction instrument. The present and newest technique is called cryo-extraction wherein a super-cooled silver stylet is frozen onto the lens surface through the pupil. The freezing makes the lens hard and it firmly adheres to the stylet, allowing its extraction by said instrument. This stylet must have a certain diameter to conduct sufficient cooling to the lens. At present this diameter is not reducible and as a result there is always the present danger of surrounding tissues such as the iris and cornea accidentally becoming frozen onto the stylet. This, of course, can cause considerable difficulty and may lead to complications.

It has therefore become necessary to find some means of providing more space for the application of the cryo-extractor stylet onto the lens. Methods of accomplishing a widing of the pupil have included dilating drugs or the use of an instrument called the iris hook which has a conventional handle to be held by an assistant under a traction. The dilating drugs have not given sufficient widening to alleviate the danger of the stylet contacting the surrounding tissue. The use of an iris hook does not give a very efficient widening and adds the chance of accidental movement due to the unsteadiness of the assistant which may cause pressure on the eye or too great a pull. Additionally, this method causes the presence of another hand in the way of the surgeon's delicate operational movements.

The retractor of the present invention substantially eliminates the problems and dangers heretofore presented.

The retractor of the present invention has the advantage of enlarging the pupil to an extent heretofore never achieved by pupil dilating drugs and/or by the conventional iris hook.

The present invention provides retraction of the iris to expose the optimal spot for adhesion of the cryo-extractor onto the lens.

The retractor of the present invention is preferably formed of an insulating material to avoid the freezing of the iris or wound edges if the stylet were ever to come too close to the retractor.

The present invention provides a new method of retracting and maintaining the iris retracted during the extraction of the eye lens.

The device of the present invention and its use during eye surgery eliminates the presence of another hand in the surgeon's field of view and gives the surgeon greater maneuverability. Further, it avoids any errors that might be caused by an assistant when using a conventional iris retractor.

The retractor of the present invention is adapted to be attached to the eyeball and eliminates any damage that might be caused by involuntary eye movements during surgery as such movements cannot affect the retracted iris nor the position of the lens with relation thereto.

These and other features and advantages of the present invention will become more apparent after a perusal of the following detailed description which refers to the accompanying drawing wherein;

FIGURE 1 is a perspective view of a retractor formed in accordance with the present invention;

FIGURE 2 is a plan view of the retractor of FIGURE 1;

FIGURE 3 is a side view of the retractor of FIGURES 1 and 2;

FIGURE 4 is an elevational view of the retractor of FIGURE 1;

FIGURE 5 is a diagrammatic view of the retractor of FIGURES 1–4 in position on the eye;

FIGURE 6 is a perspective view of another form of retractor formed in accordance with the present invention;

FIGURE 7 is a side view of the retractor of FIGURE 6;

FIGURE 8 is a perspective view of another modification of the retractor;

FIGURE 9 is a side view of the retractor of FIGURE 8; and

FIGURE 10 is a fragmentary cross-sectional view on an enlarged scale of a retractor constructed in accordance with the present invention.

Referring now to the drawing, the iris retractor 10, illustrated in FIGURES 1 through 4, comprises a body portion 11, a hook 12, an eyelet 13 and a handle 14. The body portion 11 is slightly curved providing a convex upper surface, as shown in the drawing, and is generally trapezoidal-shaped in plan view, which shape is defined by a broad end, a narrow end and side edges, which connect said ends and converge toward said narrow end.

The hook 12 is formed at the broad end of the body portion 11 and has a width corresponding generally to that of said end giving the hook a wide bight portion. The hook 12 curves downwardly, as seen in the drawing, at a substantially constant radius for approximately 180 degrees and terminates at a smooth curving edge 15. The hook 12 is also curved along the broad end of the body portion 11, thus defining a hook of compound curvature adapting it to engage the tissue to be retracted, in this example the iris, without danger of damaging it. FIGURE 4 illustrates the curvature of the body portion 11 and of the curvature of the axis of the curved hook 12 extending along the end of said body portion.

Upstanding from the convex surface of the body portion 11 and inclined with relationship thereto, as shown in FIGURES 1–3, is the handle 14 which has an upper generally planar portion and which may have various shapes. This upper portion is adapted to be gripped, as by a forceps, to permit positioning of the hook 12 on the edge of the tissue to be retracted. The handle 14 is fixed to or formed with the body portion 11 and the lower portion thereof is adapted to receive a fastener or provide a coupling with a preplaced retaining member. In the illustrated embodiments, the lower portion is shaped to define a fastening or eyelet means, hereinafter referred to as the eyelet 13. The eyelet 13 is narrow and curved to receive a cooperating fastening member such as a hook or a bridle suture. The eyelet 13 integrally joins the narrow end of the body portion with the lower edge of the plate-like upper portion of the handle 14.

FIGURE 5 illustrates the retractor 10 in position on an eye before extraction of a lens 17 with its friable capsule. This figure must be understood as being drawn upside-down as one operates standing or sitting over the headside of the patient. Therefore the lower part of the eye appears on top of the drawing. This retractor is very useful for widening a pupil 16 for removal of the lens 17. During this operation, the conjuctiva is incised from the upper region of the eye downward on each side about 90 degrees, thus forming the cut edges 18. Then the iris retractor 10 is attached onto the exposed sclera by a thread 19, e.g., 7–0 silk, formed to have a bridle suture hooked through the eyelet 13 and held to the sclera by two sutures. A keratotomy is then made and the keratome opening is widened downward 90 degrees on each side. The figure shows the cut edge of the cornea 20 lifted to expose the iris 21. The hook 12 of the iris retractor is now inserted into the pupil 16 and behind the iris 21. The thread 19 is pulled and the iris 21 is retracted up to the wound edges. This exposes the optimal spot on the lens 17, as indicated by the dotted circle 22, at which the cryoextractor stylet is applied. After a number of seconds, e.g., 15 seconds, for freezing the stylet to the lens 17, the lens 17 is extracted by traction and striking pressure, the latter being applied a little away from the margin of the cornea with a muscle hook from outside and opposite to the spot of freezing, i.e., at the lower part of the eye. The lens will come out easily in a sliding manner over the self-retaining iris retractor 10. When a fastening or retaining member other than suture material is used the retaining member may be coupled to the retractor 10 after it is drawn toward the area of attachment of the retaining member. The retaining member may also be a light tension spring to retract the retractor 10.

FIGURES 6 and 7 show an embodiment of the retractor and this retractor, generally designated 25, comprises a body portion 26, hook 27, handle 28 and eyelet means 30. In this embodiment the handle 28 is not positioned at the narrow end of the body portion 26 but is formed more centrally thereof and extends away from and at an angle with respect to its upper convex surface. The lower portion of the handle 28 has a curved configuration to define the eyelet 30 suitable to receive a fastener or thread in the same manner as the eyelet of the retractor 10. This retractor 25 is adapted for use in the same manner as the retractor 10.

FIGURES 8 and 9 illustrate a third embodiment of a retractor, formed in accordance with this invention. The retractor, generally designated 33, comprises a body portion 34, a hook 35, an eyelet 36 and a handle 37. The body portion 34 corresponds to the body portion of retractors 10 and 25 and hook 35 corresponds to the hook 12 and 27. The handle 37 extends away from and at an angle relative to the body portion 34. The upper portion is plate-like, as in the other described embodiments and is affixed to the body portion 34 generally centrally thereof. The upper portion is joined to the body portion by a narrow annular portion 38, the center thereof forming the eyelet 36 which is adapted to receive the fastening thread which may be passed therethrough to retain the retractor in place.

The retractors 10, 25 and 33 are preferably formed of a heat insulating material such as a thermoplastic polymeric material. A preferred form of retractor has a cross-section as illustrated in FIGURE 10, wherein the material of the retractor forms a pair of thin spaced walls 40 and 41 between which is a thin core or cavity 42. This structure affords better insulating qualities, although the cavity may contain a fluid, e.g., air, or a suitable low or high density foam, e.g., polystyrene. The retractor may however be a solid member.

The retractor for the iris will have a width at the hook of about 4 millimeters and the length of the body will be about 4 millimeters from the hook to the narrow end. As shown in the drawings, particularly FIGURE 5, the length of the retractor or strip iris hook 10, 25, 33, including body member or shank portion 11, 26, 34 and hook or base portion 12, 27, 35, must be small enough to permit anchoring of it in the sclera of the eyeball with the iris 21 retracted to its edge. The retractor may be easily packed in a sterile package, with or without the suture material enclosed therein, and with or without the suture material attached to the eyelet of the retractor.

Having described my invention with reference to three embodiments of the retractor, it is to be understood that certain changes and modifications may be made therein, such as the shape of the body portion and handle, without departing from the spirit or scope of this invention.

What is claimed is:

1. A surgical device for retracting the iris comprising:
   a concave-convex body member having a pair of ends and side edges that generally converge from one of said ends toward the other,
   a hook integral with said body member formed on the broad end of said body member and having a continuous curve toward the concave surface of said body member for about 180°,
   said hook of a size and shape adapted to engage an edge of said iris,
   a handle formed on said body member to afford easy location of said device, said handle extending away from the convex surface of said body member and in a direction away from said hook, and
   fastening means formed on said body member and adapted to retain a fastening member to retain the device in place,
   said body member extending between said hook and the other of said ends a distance no greater than the distance between the retracted edge of said iris and the edge of the sclera portion of the eyeball, permitting said fastening member to be anchored in said sclera portion when said iris is retracted by said hook.

2. A surgical device for retracting the iris comprising:
   a concave-convex member having a pair of ends,
   a hook integral with said body member formed on one of said ends and adapted to engage the edge of said iris to be retracted, said hook having a continuous curve away from said body member in the direction of the concave surface and being curved along said one of said ends,
   a handle formed on said body member generally centrally thereof and extending away from the convex surface of said body member in a direction opposite that of the hook, said handle being generally plate-like and inclined in relationship to said body member, and said handle being formed to define a fastening means in the lower portion thereof to receive a fastening member, said body member extending between said hook and the other of said ends a distance no greater than the distance between the retracted edge of said iris and the edge of the sclera portion of the eyeball, permitting said fastening member to be anchored in said sclera portion when iris is retracted by said hook.

3. An iris retractor comprising a thin form-retaining strip device having a pair of thin spaced walls formed as a retractor hook of a total length to be accomodated bodily between the limbas region and the exposable outer periphery of the sclera, said hook including shank and base portions, said base portion curved to retractively engage an edge of the iris, said shank portion including fastening means to permit suturing said hook to the sclera for holding the iris retracted.

References Cited

UNITED STATES PATENTS

| 257,215 | 5/1882 | Doyle | 128—20 |
| 2,117,312 | 5/1938 | Gauly | 128—303 |

OTHER REFERENCES

V. Mueller and Co. catalog, copyright 1956, p. 6; International Text Book of Surgery, vol. 11, pp. 835–7 relied upon.

Time Magazine, Apr. 30, 1965 vol. 85, No. 18, pp. 85 and 86.

RUSSELL R. KINSEY, Primary Examiner

G. F. McNEILL, Assistant Examiner